No. 642,699. Patented Feb. 6, 1900.
C. KESSLER.
SELF LABELING BAKER.
(Application filed Oct. 2, 1899.)
(No Model.)

WITNESSES:
C. S. Frye.
J. A. Walsh.

INVENTOR
Christian Kessler,
BY Chester Bradford,
ATTORNEY.

UNITED STATES PATENT OFFICE.

CHRISTIAN KESSLER, OF INDIANAPOLIS, INDIANA.

SELF-LABELING BAKER.

SPECIFICATION forming part of Letters Patent No. 642,699, dated February 6, 1900.

Application filed October 2, 1899. Serial No. 732,377. (No model.)

*To all whom it may concern:*

Be it known that I, CHRISTIAN KESSLER, a citizen of the United States, residing at Indianapolis, in the county of Marion and State of Indiana, have invented certain new and useful Improvements in Self-Labeling Bakers, of which the following is a specification.

The object of my said invention is to produce a surface by means of which any desired inscription may be plainly produced upon a loaf of bread during the process of baking, thus avoiding the use of paper labels, tags, or other objectionable devices for marking.

A baking-pan embodying said invention will be first fully described and the novel features thereof then pointed out in the claim.

Figure 1:
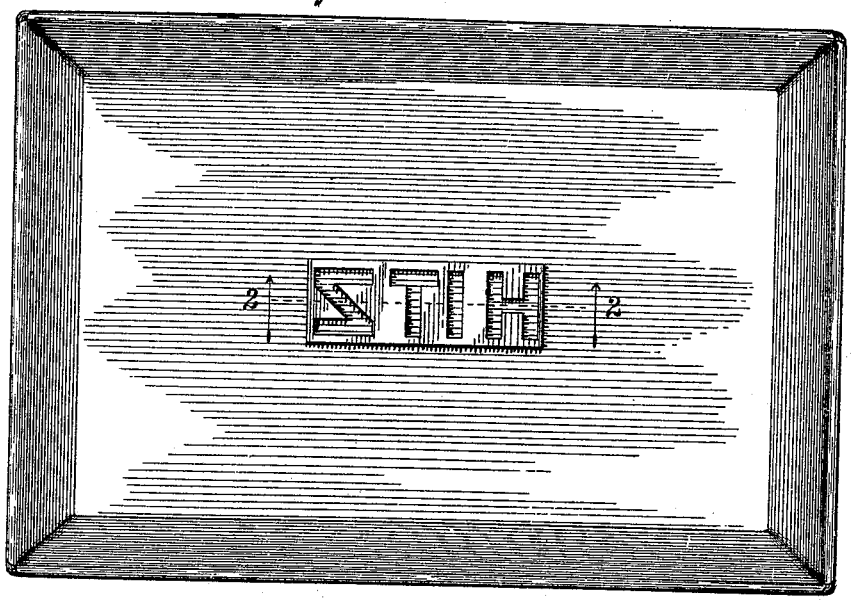
Figure 2:
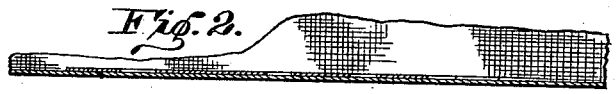
Figure 3:
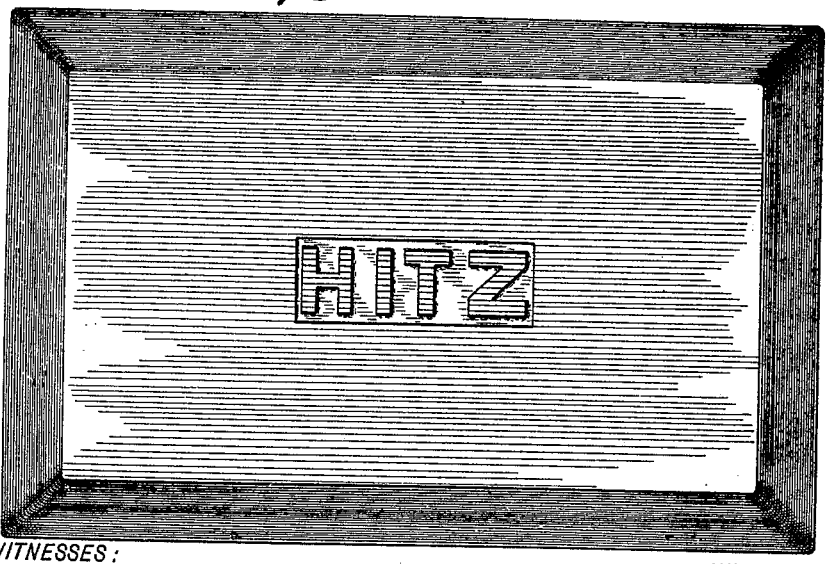

Referring to the accompanying drawings, which are made a part hereof, Figure 1 is a top or plan view of an ordinary baking-pan provided with a labeling device embodying my said invention; Fig. 2, a detail sectional view on the dotted line 2 2 in Fig. 1 on an enlarged scale, and Fig. 3 a bottom plan view of a loaf of bread bearing the inscription produced by the baking-pan shown in Fig. 1.

Loaves of bread are usually distributed from bakeries in wagons and are piled upon each other. As will be readily seen, therefore, if an inscription were produced by means of raised lettering it would be likely to become obliterated by the contact of the loaf bearing it with other loaves or with the sides of the case or shelves containing the loaves. I provide, therefore, that the lettering of the inscription shall be on a level with the remaining surface of the loaf and that there shall be small depressed portions immediately surrounding the lettering.

In applying my invention to baking-pans or other surfaces upon which baking is done I first cut out in a piece of sheet metal the letters or characters forming the desired inscription. I then secure the sheet metal to the surface upon which the baking is to be done. The form of the letters or characters is thus shown through the cuts from said surface, and said letters or characters are surrounded by narrow bands of metal. When the dough is placed in position for baking, these narrow bands impress themselves into the body of the dough, while the remaining portion, including the form of the letters or characters, comes in contact with the structure originally forming the baking-surface. At the point where the piece of sheet metal is attached the aggregate thickness of metal is greater than at any other point and offers a greater resistance to the transmission of heat from the baking-oven to the bread being baked than at other points. The result is that the points covered or protected by this additional thickness of metal are lighter in color than the remainder of the loaf, so that the letters are brought out plainly and clearly by means of the light border thereto thus produced, while the letters themselves being no higher than the remainder of the surface of the loaf are not liable to be spoiled by abrasion consequent upon contact with surrounding surfaces.

Having thus fully described my said invention, what I claim as new, and desire to secure by Letters Patent, is—

A self-labeling baker embodying in its construction a means of producing labels upon the loaves baked therein, consisting of a plate having openings cut therein of the form of the letters or characters constituting the inscription, which plate thus forms a bordering around the letters and impresses itself into the loaves and constitutes an additional thickness for the pan at the point where applied, thereby protecting the adjacent portions of the bread being baked from heat to a degree, and causing the letters or characters constituting the inscription to be surrounded by a lighter-colored border when the loaf has been baked, substantially as set forth.

In witness whereof I have hereunto set my hand and seal, at Indianapolis, Indiana, this 30th day of September, A. D. 1899.

CHRISTIAN KESSLER. [L. S.]

Witnesses:
  CHESTER BRADFORD,
  JAMES A. WALSH.